(12) United States Patent
Savić

(10) Patent No.: US 12,591,958 B2
(45) Date of Patent: Mar. 31, 2026

(54) INFRA-RED CONTRAST ENHANCEMENT FILTER

(71) Applicant: Cubic Corporation, San Diego, CA (US)

(72) Inventor: Nemanja Savić, Niš (RS)

(73) Assignee: Cubic Corporation, San Diego, CA (US)

( * ) Notice: Subject to any disclaimer, the term of this patent is extended or adjusted under 35 U.S.C. 154(b) by 454 days.

(21) Appl. No.: 18/185,102

(22) Filed: Mar. 16, 2023

(65) Prior Publication Data

US 2023/0298144 A1     Sep. 21, 2023

Related U.S. Application Data

(60) Provisional application No. 63/320,596, filed on Mar. 16, 2022.

(51) Int. Cl.
| | |
|---|---|
| *G06T 5/00* | (2024.01) |
| *G06T 5/40* | (2006.01) |
| *G06T 5/90* | (2024.01) |
| *G06T 7/11* | (2017.01) |
| *G06V 10/28* | (2022.01) |

(Continued)

(52) U.S. Cl.
CPC .................. *G06T 5/90* (2024.01); *G06T 5/40* (2013.01); *G06T 7/11* (2017.01); *G06V 10/28* (2022.01); *G06V 10/60* (2022.01); *H04N 21/2187* (2013.01)

(58) Field of Classification Search
CPC ......................... G06T 5/40; G06T 2207/20021
See application file for complete search history.

(56) References Cited

U.S. PATENT DOCUMENTS

| | | | |
|---|---|---|---|
| 8,265,391 B1 | 9/2012 | Srinivasan et al. | |
| 11,392,134 B1 * | 7/2022 | Ferdowsi .................. | G01J 5/06 |

(Continued)

OTHER PUBLICATIONS

Li, Shuo et al., An improved contrast enhancement algorithm for infrared images based on adaptive double plateaus histogram equalization, Infrared Physics & Technology, Elsevier Science, GB, vol. 90, Mar. 13, 2018, pp. 164-174.

(Continued)

*Primary Examiner* — Sumati Lefkowitz
*Assistant Examiner* — Wayne Zhang
(74) *Attorney, Agent, or Firm* — MUGHAL GAUDRY & FRANKLIN PC

(57)     ABSTRACT

A method and a system for enhancing contrast for an electro-optical video for live streaming is disclosed. An image block from an electro-optical frame of a video is received, where a number of pixels in the image block are identified to compute intensity of the image block. A distribution of intensity of the number of pixels in the image block is determined, and from the distribution, a degree of variation is determined, where a lower threshold and upper threshold for the intensity are determined. An upper set of pixels and a lower set of pixels is determined, which is then used to modify the distribution. The degree of variation is modified to determine uniformity in distribution intensity. A transform using the uniformity is constructed to enhance the contrast of the image block. The contrast of all image blocks of the electro-optical is enhanced by applying the transform.

18 Claims, 7 Drawing Sheets

(51) Int. Cl.
    *G06V 10/60*       (2022.01)
    *H04N 21/2187*   (2011.01)

(56) References Cited

U.S. PATENT DOCUMENTS

| | | | | |
|---|---|---|---|---|
| 2007/0177033 A1* | 8/2007 | Bennett | .................... | H04N 1/58 |
| | | | | 348/E9.042 |
| 2010/0296745 A1* | 11/2010 | Strom | .................. | H04N 19/176 |
| | | | | 382/233 |
| 2012/0170027 A1* | 7/2012 | Tsukizawa | ................ | G06T 7/00 |
| | | | | 356/124 |
| 2016/0189354 A1* | 6/2016 | Kikuchi | .................. | G06T 7/136 |
| | | | | 382/167 |
| 2016/0364876 A1* | 12/2016 | Lackey | ................... | G06T 7/136 |
| 2019/0198540 A1* | 6/2019 | Shibata | .................... | G06T 3/40 |

OTHER PUBLICATIONS

Wang Liang et al., Method of infrared image enhancement based on histogram, Optoelectrics Letters, vol. 7 No. 3, May 1, 2011, pp. 237-240.

* cited by examiner

300 A

300 B

300 C

INFRA-RED CONTRAST ENHANCEMENT FILTER

CLAIM FOR PRIORITY

This application claims the benefit of priority to U.S. Provisional Patent Application No. 63/320,596, filed on Mar. 16, 2022, which is incorporated by reference in its entirety.

BACKGROUND

This disclosure generally relates to a system and a method and, not by way of limitation, to enhance contrast for an electro-optical video for live streaming.

SUMMARY

In various image processing techniques, the contrast of an image is adjusted in order to provide more clarity to the image. The contrast represents the variation in luminance at various sections of the image. Therefore, the contrast of the image is adjusted according to the different processing at different sections of the image. The image could be a static image or an image frame of a video stream.

In one embodiment, a method and a system for enhancing contrast for an electro-optical video for live streaming is disclosed. An image block from an electro-optical frame of a video is received, where a number of pixels in the image block are identified to compute intensity of the image block. A distribution of intensity of the number of pixels in the image block is determined, and from the distribution, a degree of variation is determined, where a lower threshold and upper threshold for the intensity is determined. An upper set of pixels and a lower set of pixels is determined, which is then used to modify the distribution. The degree of variation is modified to determine uniformity in distribution intensity. A transform using the uniformity is constructed to enhance the contrast of the image block. The contrast of all image blocks of the electro-optical is enhanced by applying the transform.

In another embodiment, a method for enhancing contrast for an electro-optical video for live streaming is disclosed, the method comprises receiving an image block. The image block is part of an electro-optical frame. The electro-optical frame comprises a plurality of image blocks. The image block is one of the plurality of image blocks, and the electro-optical frame is one of a plurality of electro-optical frames generated from an image sensor to form the electro-optical video. The method further comprises computing intensity for the image block. For the image block, the intensity is computed based on a number of pixels therein. The method further comprises determining a distribution of intensity of the number of pixels in the image block. Each of the number of pixels has a pixel intensity. The method further comprises quantizing a degree of variation in the intensity for the number of pixels, determining an upper threshold and a lower threshold for intensity of the number of pixels based on the degree of variation, determining an upper set of the number of pixels outlying the upper threshold, determining a lower set of the number of pixels outlying the lower threshold. The method further comprises modifying the distribution of pixel intensity by:

for the upper set, reducing the pixel intensity of each of the pixels to a first predetermined intensity, and
for the lower set, increasing the pixel intensity to a second predetermined intensity.

The method further comprises modifying the degree of variation to determine a uniformity in distribution of intensity for the image block; constructing a transform using the uniformity to enhance the contrast of the image block; and applying the transform to the plurality of image blocks to enhance the contrast of the plurality of image blocks image blocks.

In still embodiment, a system for enhancing contrast for an electro-optical video for live streaming. The system comprises an image processor to receive an image block. The image block is part of an electro-optical frame. The electro-optical frame comprises a plurality of image blocks. The image block is one of the plurality of image blocks, and the electro-optical frame is one of a plurality of electro-optical frames generated from an image sensor to form the electro-optical video. The image processor computes intensity for the image block. For image block, the intensity is computed based on a number of pixels therein. The image processor determines a distribution of intensity of the number of pixels in the image block, where each of the number of pixels has a pixel intensity. The system further comprises a quantizer communicably coupled to the image processor to quantize a degree of variation in the intensity for the number of pixels, determine an upper threshold and a lower threshold for intensity of the number of pixels based on the degree of variation, determine an upper set of the number of pixels outlying the upper threshold; and determine a lower set of the number of pixels outlying the lower threshold. The system further comprises a modifier communicably coupled to the quantizer to modify the distribution of pixel intensity by:

for the upper set, reducing the pixel intensity of each of the pixels to a first predetermined intensity, and
for the lower set, increasing the pixel intensity to a second predetermined intensity; and The modifier modifies the degree of variation to determine a uniformity in distribution of intensity for the image block. The system further comprises an enhancer communicably coupled to the modifier to construct a transform using the uniformity to enhance the contrast of the image block and apply the transform to the plurality of image blocks to enhance the contrast of the plurality of image blocks image blocks.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Embodiments described herein are generally related to a method and a system for enhancing contrast for an electro-optical video for live streaming. In particular, some embodiments of the disclosure describe processes for capturing a video via an aerial platform or a ground platform in a military environment. The disclosure specifically indicates receiving the video having a plurality of electro-optical frames. Each of the plurality of electro-optical frames has an image block. The image block has a number of pixels and the intensity of the image block is computed based on the number of pixels. A distribution of intensity for the image block is determined based on the number of pixels in the image block. A degree of variation in intensity is determined for the number of pixels, with a lower and upper threshold for the intensity. An upper set of pixels and a lower set of pixels is determined, which is then used to modify the distribution. The degree of variation is modified to determine uniformity in distribution intensity. A transform using the uniformity is constructed to enhance the contrast of the image block. The contrast of all image blocks of the electro-optical is enhanced by applying the transform.

The presentation of the enhanced video helps a user or a solider to accurately identify physical objects or events in a geographical area captured in the video. Even at night, infra-red videos are enhanced to ensure a greater situational awareness to enable swift responses related to any asynchronous events in the geographical area.

Figure 1:
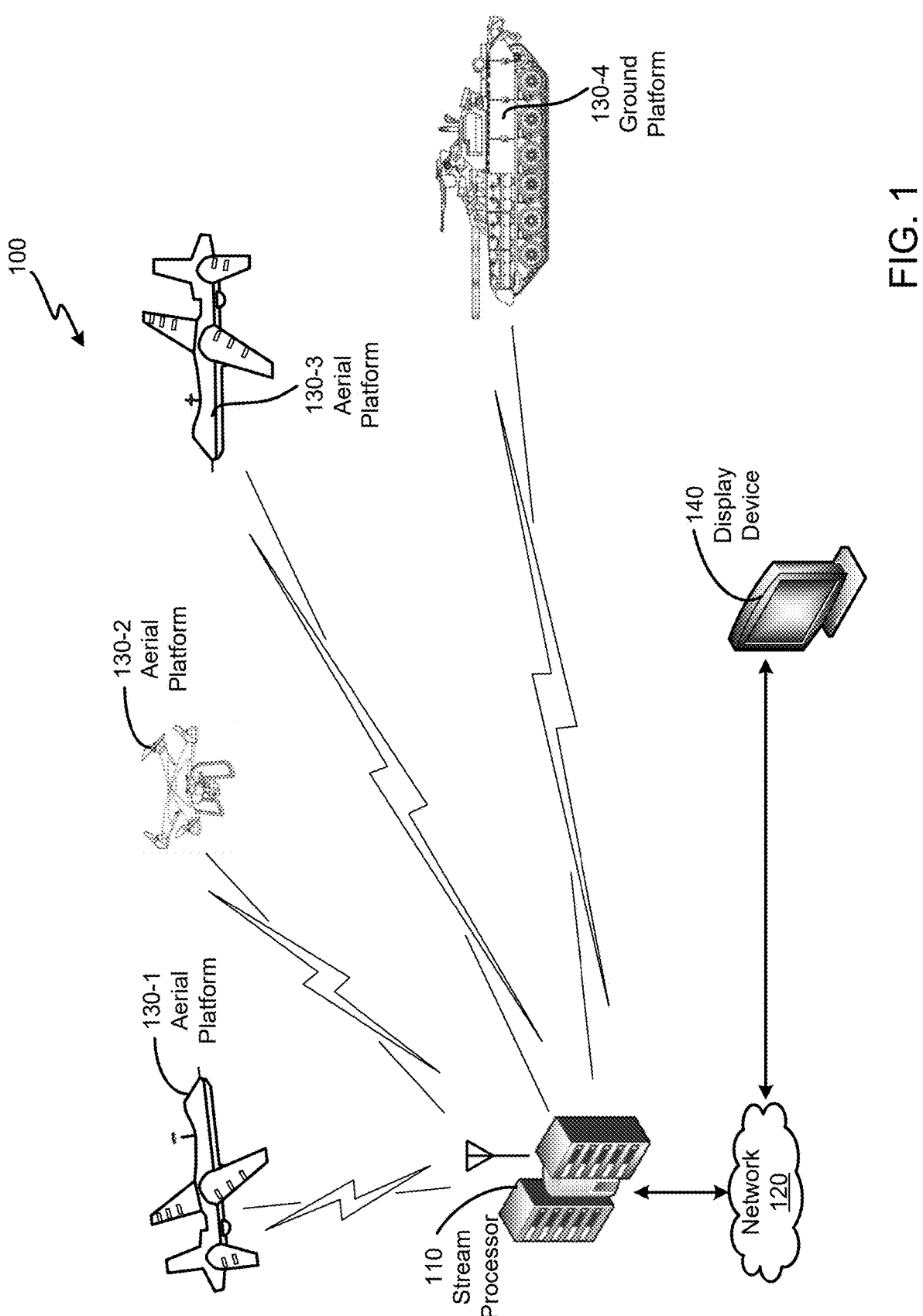
FIG. 1 illustrates a schematic representation of a military environment according to an embodiment of the present disclosure.

Referring to FIG. 1, illustrates a military environment 100 that includes elements for enhancing contrast for an electro-optical video. The military environment 100 includes a stream processor 110, a communication network 120, three aerial platforms 130-1, 130-2, 130-3, a ground platform 130-4, and a display device 140.

In the military environment 100 various operations may be performed by utilizing videos incoming from video sources. The operations may relate to the identification of a geographical area with specific details of physical objects present in the geographical area. For this, a video is captured from the video sources via the aerial platforms 130-1, 130-2, 130-3, and the ground platform 130-4. The aerial platforms 130-1, 130-2, and 130-3 are moving vehicles, such as an airplane, drones, or the like, and the ground platform 130-4 are moving vehicles for example a tank operating on the battlefield. The aerial platforms 130-1, 130-2, 130-3, and the ground platform 13-4 use a camera or an image sensor and other onboard electrical components to capture video of the geographical area and transmit video feed via the communication network 120 to the display device 140. The video feed is transmitted to a stream processor 110 for analysis. The stream processor 110 is a command center, operations room, control outpost, or the like. The stream processor 110 comprises multiple processing elements for performing video processing and analysis in real time. In an example, the stream processor may work in combination with a geographical server to utilize various geospatial tools for collaborating with the stream processor 110 to receive Geo-tag data. The geographical server may further include an integrated database to provide the Geo-tag data in accordance with the geographical area of the video captured from a video source. The communication network 120 can be a wide area network (WAN). The WAN may comprise one or more public and/or private data communication networks, including the Internet, one or more cellular, radio, or other wireless WANs (WWANs), and/or the like.

The stream processor 110 receives the video from the platforms 130-1 to 130-4 to process and filter the video to enhance the contrast of the video in real-time. For example the stream processor 110 works on multiple types of electro-optical (EO) videos, for example, infra-red videos. The IR videos have different signal properties as compared to other EO videos. The stream processor can adapt according to the IR video. The stream processor can perform a globally smooth local enhancement for all EO videos. The image is divided into non-overlapping regions that are used to compute local enhancement functions, which are then used to jointly enhance individual pixels so that global consistency is ensured. All of this is automatically achieved for every video without any user intervention.

Platforms 130-1 to 130-4 include multiple sensors to create metadata indicative of the location of the geographical area captured in the video. The metadata provides geographical coordinates of the physical objects within the frame of the video. Further, the sensors are designed to generate raw sensor data. The sensors are selected from a Global Navigation Satellite System GNSS) receiver (e.g., a Global Positioning System (GPS) receiver), magnetometer, altimeter, gyroscope, accelerometer, and/or the like, and may be generally indicative of a location of the geographical area in the video as well as elevation, azimuth, and orientation of the camera capturing video.

In some embodiments, the sensor data is embedded into the video feed in accordance with governing standards and protocols. The standards are protocols are dependent on various jurisdictions. For example, a Motion Imagery Standards Board (MISB) standard 0601 is one such standard indicating how sensor data is embedded into the video (e.g., as a real-time, synchronous MISB key-length-value (KLV) stream). In some other embodiments, alternative standards may be used depending on desired functionality.

In some embodiments, the stream processor 110 is designed to identify an error in the metadata of the video feed. In some embodiments, the stream processor 110 is configured to receive the video from platforms 130-1 to 130-4 and forward the video and the GIS data to a command center of the user equipment to initiate further processing and generation of composite video and displaying of the composite video on the user equipment.

Figure 2A:
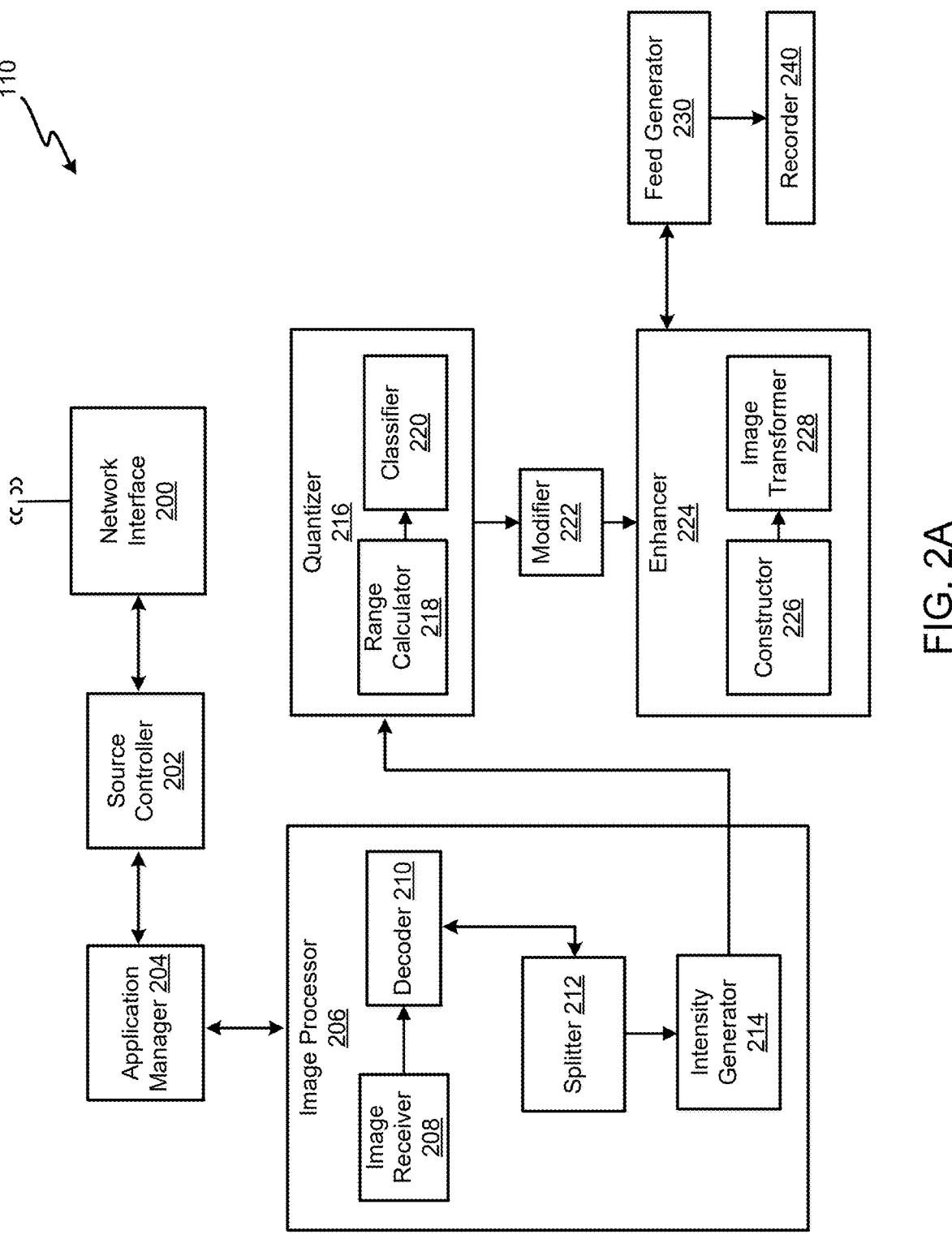
FIG. 2A illustrates a block diagram showing a stream processor according to an embodiment of the present disclosure.

Referring to FIG. 2A, illustrates a block diagram of the stream processor 110 as described in FIG. 1. The stream processor 110 includes a network interface 200, a source controller 202, an application manager 204, an image processor 206, an image receiver 208, a decoder 210, a splitter 212, an intensity generator 214, a quantizer 216, a range calculator 218, a classifier 220, a modifier 222, an enhancer 224, a constructor 226, an image transformer 228, a feed generator 230, and a recorder 240.

The platforms 130-1 to 130-4 communicate with the stream processor 110 via the network interface 200, where the source controller 202 is configured to select the platforms 130-1 to 130-4. The source controller 202 is further configured to calibrate the platforms 130-1, and 130-4 with respect to altitude, speed, and location of the platforms 130-1, 130-4, and the field of view (FOV) of the camera. The calibration is performed either on the ground or in flight before capturing the video. The source controller 202 used herein is a controller that is a built-in computer or chipset or processor, which functions in combination with the application manager 204. The application manager 204 is a user interface that executes processes for both stream processors 110 and the platforms 130-1, and 130-4. In some embodiments, the application manager 204 works external to the stream processor 110, for example, at user equipment. The application manager 204 provides communication connectivity between various applications at the stream processor 110 and the platforms 130-1, and 130-4. The network interface 200 also communicates with the image processor 206.

The image processor 206 is configured to receive an image block that is part of an electro-optical frame. The image processor comprises the image receiver 208 to receive the electro-optical frame, whereas the decoder 210 decodes the electro-optical frame. The splitter 212 partitions the electro-optical frame into multiple image blocks. The electro-optical frame comprises a plurality of image blocks, and the image block is one of the plurality of image blocks. The electro-optical frame is one of a plurality of electro-optical frames generated from an image sensor to form the electro-optical video. The image processor 206 has an intensity generator 214 to compute intensity for the image block based on the number of pixels therein. The image processor 206 determines a distribution of intensity of the number of pixels in the image block, where each of the pixels has a pixel intensity. The quantizer 216 is communicably coupled to the image processor to quantize a degree of variation in the intensity for the number of pixels. The quantizer 216 has a range calculator 218 that is further configured to determine an upper threshold and a lower threshold for the intensity of the number of pixels based on the degree of variation. The classifier 220 of the quantizer 216 is further configured to determine an upper set of the number of pixels outlying the upper threshold. The quantizer 216 is further configured to determine a lower set of the number of pixels outlying the lower threshold.

Here the distribution of intensity is calculated using the Cumulative distribution function of a real valued random variable X is the function given by $F_X(x)=P(X \leq x)$. For a discrete case, where random variable X takes a finite set of possible values it can be computed in the following way $F_X(x)=\Sigma_{x_i \leq x}P(X=x_i)$.

For a uniform distribution, its cumulative distribution function is a straight line given by the following equation $f(x)=x$. For the distribution in question cumulative distribution function is given by the Lorenz curve. In our case, the Lorenz curve is a cumulative distribution function of a real valued random variable X with a special condition that the probabilities of random variable are non-decreasing e.g., $P(x=x_i) \leq P(x=x_{i+1})$, $\forall x_i$.

Given all of this, Gini coefficient is calculated in our case by following formula $$G = \frac{\sum_x U(x) - C(x)}{\sum_x U(x)},$$

where G is Gini coefficient, U(x) is uniform distribution function and C(x) is cumulative distribution function.

The cumulative distribution function in our case is computed using the histogram calculated over a grid cell, normalizing every bin of the histogram by dividing it by the total number of pixels in the grid cell, and then sorting the bins in ascending order which satisfies the condition entailed that the calculated cumulative distribution functions are at the same time the Lorenz curve.

After the Gini coefficient is calculated, we use it to calculate the upper and lo thresholds for histogram modification. The lower threshold does not depend on the Gini coefficient, and it essentially tells us what the optimal pixel count per luminosity level is, or more precisely $$minThd = \frac{totalPixelNumber}{numberOfHistgramBins}.$$

The upper threshold is a weighted sum of the maximum number of pixels in a histogram bin and the minimum threshold, where the weight is given by the Gini coefficient, or more precisely maxThd=(1−giniCoef) *maxHistogramBinCount+gini*minThd. The first predetermined intensity correlates to the upper threshold and the second predetermined intensity correlates to the lower threshold.

A computing function of distribution for the histogram is determined by normalizing the histogram; and upon normalizing the histogram, determining the weight of the histogram by calculating an inverse Euclidean distance between pixels and the center of the histogram. The weight is determined by $$w_k^i = \frac{1}{\sqrt{(x_i - x_k)^2 + (y_i - y_k)^2} + \varepsilon}.$$

Furthermore, energy for each pixel is computed using the function of distribution:

$$x_k' = CDF_k(x);$$

and assigning weight of the histogram to the energy by $$x'' = \sum_k x_k' \cdot w_k.$$

The modifier 222 is communicably coupled to the quantizer 216 to modify the distribution of pixel intensity. For the upper set, the pixel intensity of each of the pixels is reduced to a first predetermined intensity, and for the lower set, the pixel intensity is increased to a second predetermined intensity. The modifier 222 modifies the degree of variation to determine a uniformity in the distribution of intensity for the image block.

The enhancer 224 is communicably coupled to the modifier to construct a transform using uniformity to enhance the contrast of the image block and apply the transform to the plurality of image blocks to enhance contrast of the plurality of image blocks.

The image processor 206 further comprises the image transformer 228 to transform the image according to the metadata. In some embodiments, the image is transformed by rotating the image, skewing or de-skewing the image, changing orientation, and scaling the image to match a particular size of the video. The feed generator 230 generates a live stream of the electro-optical video having enhanced contrast. A user is also provided with the option to record the video via the recorder 240.

Figure 2B:
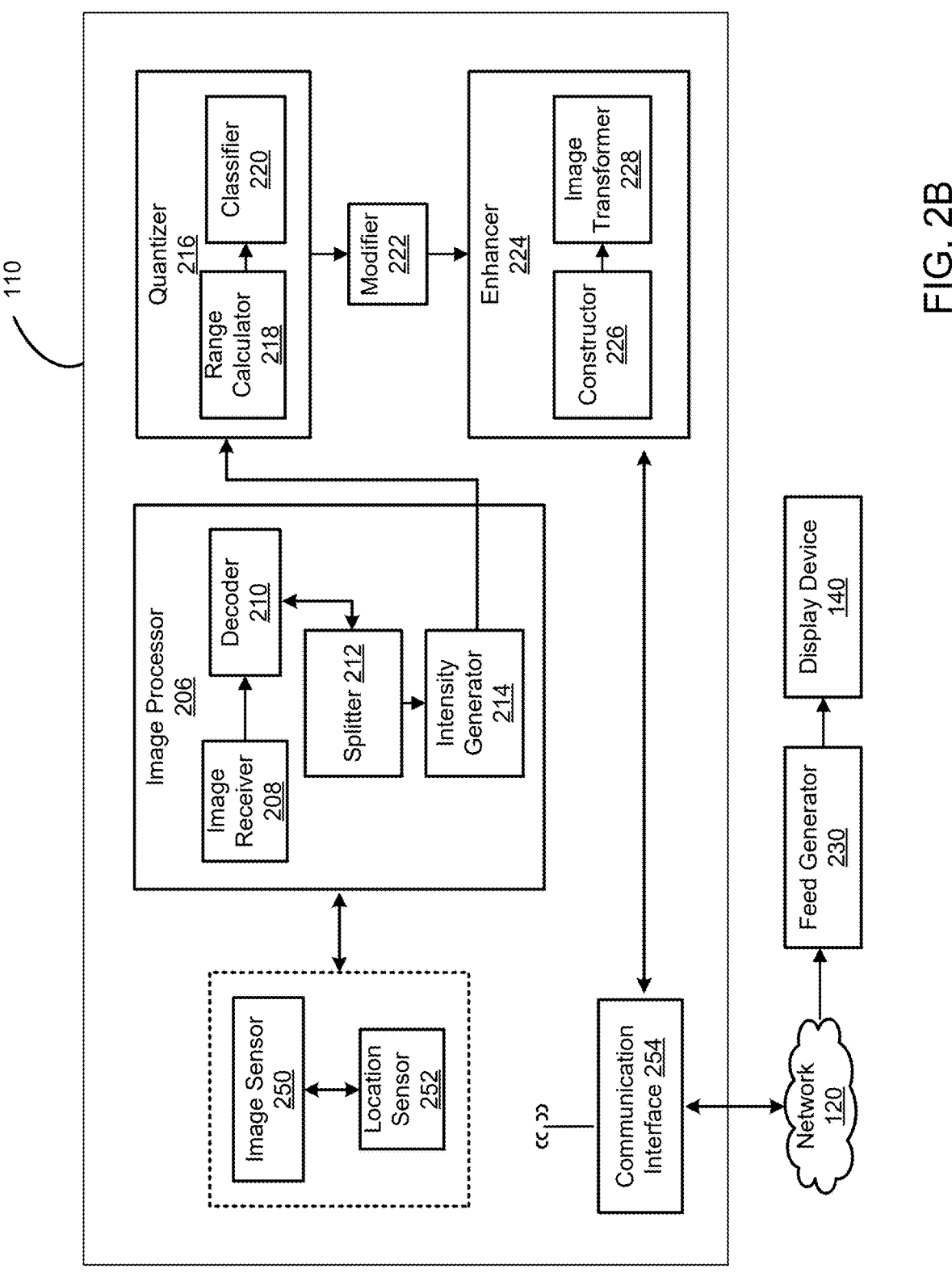
FIG. 2B illustrates a block diagram showing a stream processor according to another embodiment of the present disclosure.

Referring to FIG. 2B, illustrates a block diagram of the stream processor 110 as described in FIG. 1. Further, the stream processor 110 is similar to the stream processor of FIG. 2A. Specifically in the embodiment of FIG. 2B, the stream processor 110 is configured on platforms 130-1 to 130-4. The stream processor 110 further includes an image sensor 250, a location sensor 252, and a communication interface 254. The image sensor 250 is configured to capture electro-optical (EO) video. The image sensor 250 is a vehicular camera. The image sensor 250 works in combination with the location sensor 252 in order to provide location information for the platform as well as location information of the geographical area captured in the video. In some embodiments, the electro-optical frames are generated through illumination. In some other embodiments, the electro-optical frames are generated through thermal imaging. The stream processor 110 functions similarly to the stream processor 110 of FIG. 2, however, such a stream processor is an onboarded electronic equipment of the platforms 130-1 to 130-4. Upon enhancing the electro-optical frames, the communication interface 254 transmits the enhanced electro-optical frames to the feed generator via the network 120.

Figure 3:
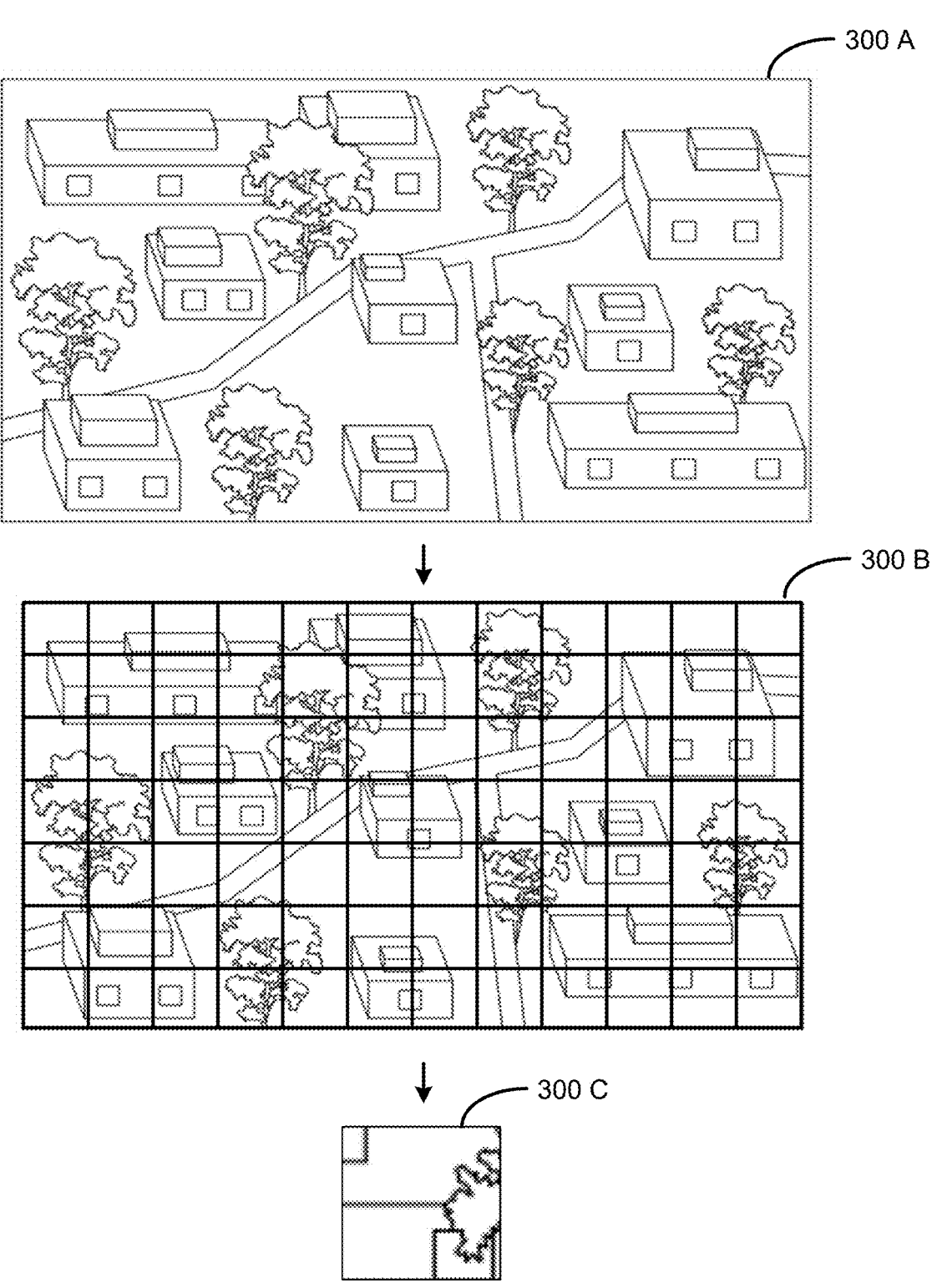
FIG. 3 illustrates a schematic representation of an image frame segmented into image blocks according to an embodiment of the present disclosure.

Referring to FIG. 3, illustrates a schematic representation of an image frame 300A segmented into image blocks. The view shows the aerial platform 130 capturing the video of the geographical area at an angled overhead view of the geographical area comprising a grid of city streets. The aerial platform 130 includes a drone, airplane, etc. Sensors on the aerial platform 130 are used to capture metadata about the geographical area. The metadata is embedded in the video. In some embodiments, the metadata includes geographical coordinates corresponding to a center and/or the four corners of the video.

Here the actual segmentation is represented, where 300A is an electro-optical frame that is partitioned into image blocks 300B, where each image block 300C has a size of 320*180 pixels. Using fixed cell width and height, whose values are 320 and 180 pixels respectively, as well as the image's width and height, grid dimensions are computed in the following way. The number of row cells is computed as numRowCells=ceil(imageWidth/cellWidth). Number of column cells is computed as numColCells=ceil(imageHeight/cellHeight).

This ensures that all the pixels of the image have been partitioned to cells in the grid, although, depending on concrete image dimensions, some of the cells may have a lower number of pixels (the default number of pixels for a cell is 320*180=57600).

The image blocks are separate blocks sharing no common area of the electro-optical frame. In other words, the image blocks are non-overlapping image blocks. An external system may be configured to generate map information that is overlayed as a graphical representation of the video. As illustrated, the landscape comprises a graphical representation of corresponding to physical features in the geographical area, such as roads and intersections. Depending on desired functionality, available map information, and/or other factors, graphical representations of other types of physical structures in the geographical area may be depicted additionally or alternatively.

Figure 4:
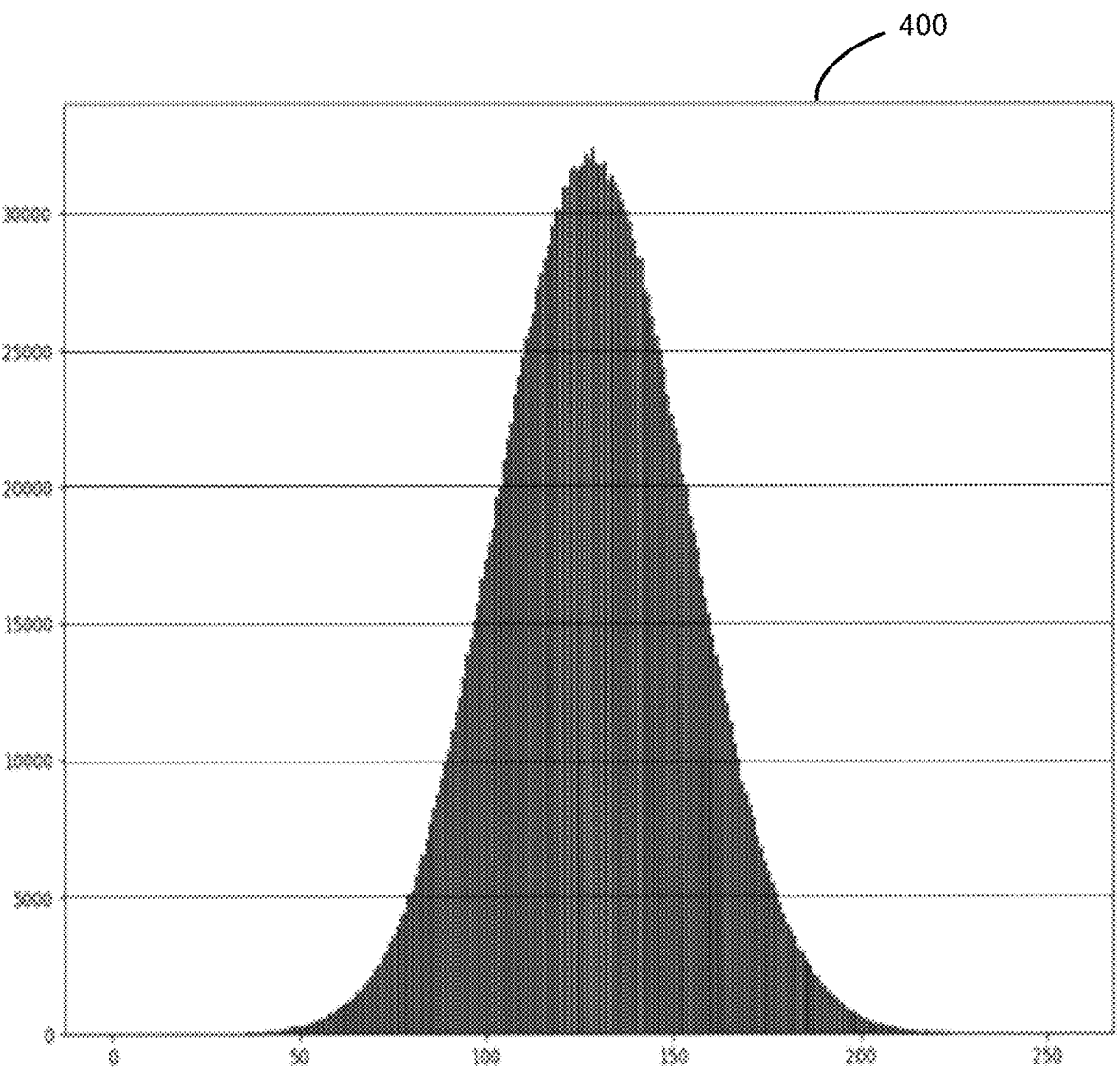
FIG. 4 illustrates a graphical representation of a histogram indicating pixel intensities according to an embodiment of the present disclosure.

Referring to FIG. 4, illustrates a graphical representation of a histogram 400 indicating pixel intensities according to an embodiment of the present disclosure. The histogram is a statistical measure of pixel values in an image. Here we are working with 8-bit images, which means that each pixel can have one of 23 different values (valid pixel values are in the 0 to 255 interval). Histogram essentially stores how many pixels have the same value in an image. In this case, we are working with histograms that have 256 bins (one for each possible pixel value), and each bin stores the number of pixels that have that value in the image. Histogram is computed then by visiting each pixel in the image and incrementing the appropriate bin in the histogram e.g., hist[pixVal]=hist[pixVal]+1. The histogram is generated and sorted in ascending order.

Figure 5A:
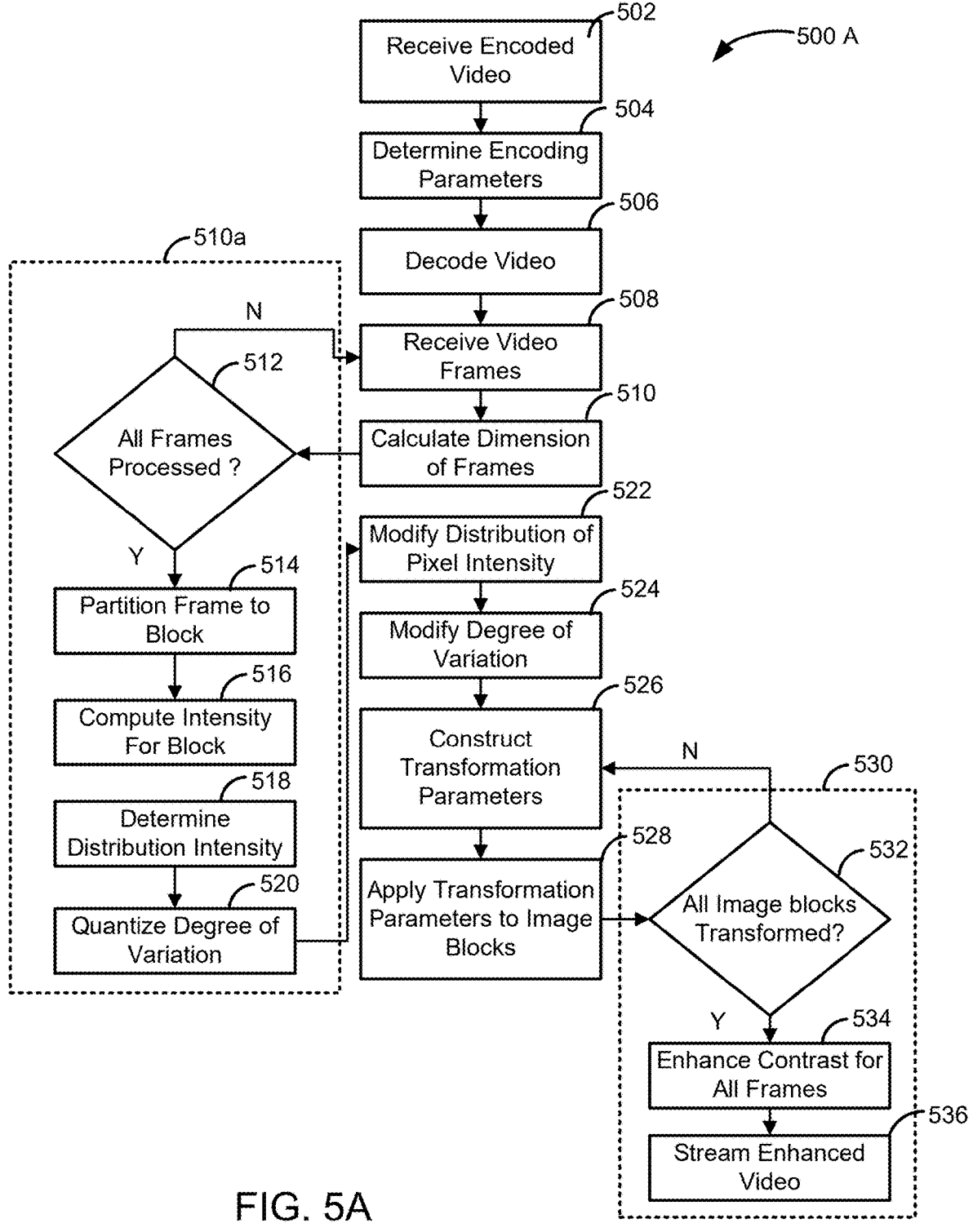
FIG. 5A illustrates a flowchart of a method for enhancing contrast for an electro-optical video according to an embodiment of the present disclosure.

Referring to FIG. 5A illustrates a flowchart of a method 500A for enhancing contrast for an electro-optical video according to an embodiment of the present disclosure. Some steps of method 600 may be performed by the stream processor 110 and by utilizing processing resources through any suitable hardware, non-transitory machine-readable medium, or a combination thereof.

Block 502, receives the video from the platforms 130-1 to 130-4 to process and filter the video to enhance the contrast of the video in real-time.

At block 504, the encoding parameters are determined, wherein an example the stream processor 110 works on multiple types of electro-optical (EO) videos, for example, infra-red videos.

At block 506, videos are decoded, where the IR videos have different signal properties as compared to other EO videos. The stream processor is able to adapt according to the IR video. The stream processor is able to perform a globally smooth local enhancement for all EO videos.

At block 508, receive an image block that is part of an electro-optical frame. The electro-optical frame comprises a plurality of image blocks, and the image block is one of the plurality of image blocks. The electro-optical frame is one of a plurality of electro-optical frames generated from an image sensor to form the electro-optical video receive video frames.

At block 510, the dimensions of the frames are calculated and the same process is repeated for all the frames, and at block 512, the processing of all the frames processed is determined.

At block 514, frames are partitioned into blocks using fixed cell width and height, whose values are 320 and 180 pixels respectively, as well as the image's width and height, grid dimensions are computed in the following way:

Number of row cells is computed as numRowCells=ceil (imageWidth/cellWidth).

Number of column cells is computed as numColCells=ceil(imageHeight/cellHeight).

This ensures that all the pixels of the image have been partitioned to cells in the grid, although, depending on concrete image dimensions, some of the cells may have a lower number of pixels (the default number of pixels for a cell is 320*180=57600).

At block 516, the intensity for each block is computed and at block 518, the distribution intensity is determined. At block 520, the degree of variation is quantized for modifying the distribution of pixel intensity that takes place at block 522.

At block 524, modify the degree of variation in CDF weights are computed by calculating the inverse Euclidean distance between the pixel that entails to be modified and the centers of the grid cells of respective histograms. In short for each cell weight is computed in the following way $$w_k^j = \frac{1}{\sqrt{(x_i - x_k)^2 + (y_i - y_k)^2} + \varepsilon},$$

where i denotes the pixel that entails to be modified, k denotes the grid cell of respected CDF and $\varepsilon$ denotes some small number to prevent division by zero. Take note that bo he pixel coordinates $(x_i, y_i)$ and grid center coordinates $(x_k, y_k)$ have been normalized by dividing them with image width and height respectively.

Computing new pixel value for all pixels in the image, their new value is computed in the following way. First, each CDF is used to calculate a new value $$x_k'$$

given the following equation $$x_k' = CDF_k(x).$$

Then, using weights computed in the previous section, the final pixel value x" is computed in the following way $$x'' = \sum_k x_k' \cdot w_k.$$

At block 526, the transformation parameters are constructed using the weights and final pixel values, where the transformation parameters to are applied to the image blocks at block 528.

At block 530, all image blocks are determined to be transformed to check the consistency, whereas at block 532, All the frames are enhanced by using the transformation parameters at block 534.

At block 536, the enhanced video stream is performed on the display device 140.

Figure 5B:
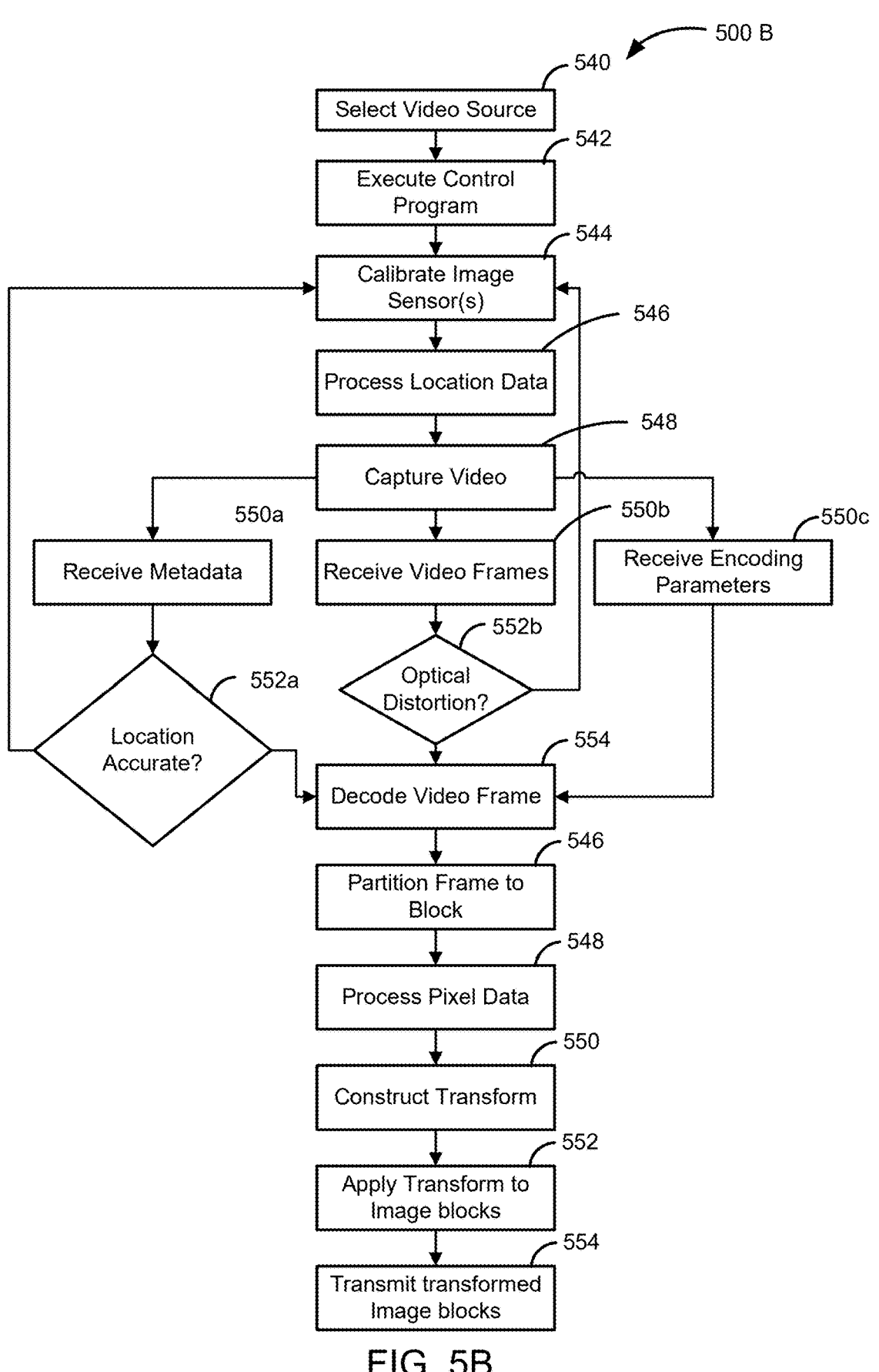
FIG. 5B illustrates a flowchart of a method for enhancing contrast for an electro-optical video according to another embodiment of the present disclosure.

Referring to FIG. 5B, illustrates a flowchart of method 500B for enhancing contrast for an electro-optical video according to an embodiment of the present disclosure. Some steps of method 500B may be performed by the stream processor 110 and by utilizing processing resources through any suitable hardware, non-transitory machine-readable medium, or a combination thereof.

At block 540, video platforms 130-1 to 130-4 are selected out of all the platforms as shown in FIG. 1. The video platforms are selected based on the current location and the flight path of the aerial platform. In some embodiments, a user may provide instructions to the aerial platform for moving to different paths. In some other embodiments, the user may operate the aerial platform or user equipment. In other words, the user may provide instructions to the stream processor 110 to enable the source controller 202 to operate and control the aerial platform 130.

At block 542, a control program, designed to operate the selected video platforms 130-1 to 130-4, is executed. The control program has a series of instructions that may be selected by the user in order to control and operate the video platforms 130-1 to 130-4.

At block 544, the video platforms 130-1 to 130-4 and a camera associated with the video platforms 130-1 to 130-4 are calibrated such that the aerial platform 130 flies over a desired geographical area and the camera can capture the video of the geographical area and the ground platform moves to the geographical area.

At block 546, calibration parameters associated with the video platforms 130-1 to 130-4 and the camera are stored in a database, so that the parameters can be checked and can be referred to at a later stage of the video capturing process. In some embodiments, the user may provide instructions to the aerial platform 130 to change the flight path and move to a different location. In some other embodiments, the user may provide instructions to change the camera focus or camera angle in order to counter distortion generated in an optical path of the camera. The instructions are used to process location data for the geographical area.

At block 548, a video of the geographical area is captured. The captured video includes multiple frames and associated metadata. The metadata may include location information of the geographical area and location information of the physical objects present in the geographical area. In some embodiments, the metadata may also include information related to azimuth, elevation and information related to other angles of the camera. Upon video capture, the video undergoes three subprocesses (550*a*, 550*b*, and 550*c*). One of the subprocesses is performed where metadata is received by the image processor 206. The second subprocess is the one where the image processor receives video frames and the last subprocess is performed to receive the encoding parameters.

At block 552*a*, the metadata is used to identify if it is a correct geographical area and is processed by the stream processor 110. Upon determining the video frames are decoded at block 554. The optical distortion is also checked at block 552*b*, and upon determining no distortion the program executes further for decoding all video frames. In other words, the received video is checked for distortion due to improper focus of the camera on the geographical region or distortion due to obstruction in an optical path of the camera towards the geographical area. The obstruction may occur due to climatic conditions, such as rain or fog. Upon identifying distortion in the video, the camera is calibrated, and the video is captured again after calibration. In some embodiments, the user may provide instruction to the aerial platform or the ground platform for displacement to a nearby flight space that may also be capable to provide video of the geographical area but maybe with a different camera angle.

In this manner, the video is dynamically updated for correcting any distortions that may have occurred at the time of capturing the video.

At block 546, each frame is partitioned into multiple image blocks. For example, the aerial platform while flying may provide a live video feed from multiple camera perspectives. Here each of camera perspectives may provide different views of the geographical area captured in the video. Therefore, a dynamic update is performed by the stream processor 110 for each image and its partitioning into multiple image blocks.

At block 548, the pixel data is processed by calculating the dimensions of the frames and the same process is repeated for all the frames. The frames are partitioned into blocks using fixed cell width and height, whose values are 320 and 180 pixels respectively, as well as the image's width and height, grid dimensions are computed in the following way:

> Number of row cells is computed as numRowCells=ceil (imageWidth/cellWidth).
>
> Number of column cells is computed as numColCells=ceil(imageHeight/cellHeight).

This ensures that all the pixels of the image have been partitioned to cells in the grid, although, depending on concrete image dimensions, some of the cells may have a lower number of pixels (the default number of pixels for a cell is 320*180=57600).

At block 550, a transform is constructed where the intensity for each block is computed and, distribution intensity is determined. A degree of variation is quantized for modifying the distribution of pixel intensity. A degree of variation is modified by computing CDF weights and by calculating the inverse Euclidean distance between the pixel that entails to be modified and the centers of the grid cells of respective histograms. In short for each cell weight is computed in the following way $$w_k^i = \frac{1}{\sqrt{(x_i - x_k)^2 + (y_i - y_k)^2 + \varepsilon}},$$

> where i denotes the pixel that entails to be modified, k denotes the grid cell of respected CDF and $\varepsilon$ denotes some small number to prevent division by zero. Take note that both the pixel coordinates $(x_i, y_i)$ and grid center coordinates $(x_k, y_k)$ have been normalized by dividing them with image width and height respectively.

Computing new pixel value for all pixels in the image, their new value is computed in the following way. First, each CDF is used to calculate a new value $$x_k'$$

> given the following equation $$x_k' = CDF_k(x).$$

Then, using weights computed in the previous section, the final pixel value x" is computed in the following way $$x'' = \sum_k x_k' \cdot w_k.$$

At block 552, the transformation parameters are constructed using the weights and final pixel values, where the transformation parameters to are applied to the image blocks.

At block, 554, the transformed image blocks are transmitted to the display device via the network interface.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A method for enhancing contrast for an electro-optical video for live streaming, the method comprises:

receiving an image block, wherein:

the image block is part of an electro-optical frame, the electro-optical frame comprises a plurality of image blocks, the image block is one of the plurality of image blocks, and the electro-optical frame is one of a plurality of electro-optical frames generated from an image sensor to form the electro-optical video;

computing intensity for the image block, wherein the intensity for the image block is computed based on the number of pixels contained therein;

determining a distribution of intensity of the number of pixels in the image block, wherein each of the number of pixels has a pixel intensity;

quantizing a degree of variation in the intensity for the number of pixels, wherein quantizing the degree of variation in the intensity for the number of pixels includes calculatin a/the Gini coefficient by $$G = \frac{\sum_x (U(x) - C(x))}{\sum_x U(x)},$$

where G is Gini coefficient, U(x) is a uniform distribution function and C(x) is a cumulative distribution function;

determining an upper threshold and a lower threshold for intensity of the number of pixels based on the degree of variation, wherein the lower threshold is determined by:

$$minThd = \frac{totalPixelNumber}{numberOfHistgramBins},$$

and the upper threshold is determined by maxThd= (1−giniCoef)*maxHistogramBinCount+ giniCoef*minThd, and wherein the upper threshold is a weighted sum of maximum number of pixels in a histogram bin and the lower threshold;

determining an upper set of the number of pixels outlying the upper threshold;

determining a lower set of the number of pixels outlying the lower threshold;

modifying the distribution of pixel intensity by:

for the upper set, reducing the pixel intensity of each of the pixels to a first predetermined intensity, and for the lower set, increasing the pixel intensity to a second predetermined intensity;

modifying the degree of variation to determine a uniformity in distribution of intensity for the image block;

constructing a transform using the uniformity to enhance the contrast of the image block; and applying the transform to the plurality of image blocks to enhance the contrast of the plurality of image blocks.

2. The method for enhancing contrast for the electro-optical video for live streaming as claimed in claim 1, wherein the image block has a size of 320*180 pixels.

3. The method for enhancing contrast for the electro-optical video for live streaming as claimed in claim 1, wherein each of the plurality of image blocks are separate blocks sharing no common area of the electro-optical frame.

4. The method for enhancing contrast for the electro-optical video for live streaming as claimed in claim 1, wherein the plurality of electro-optical frames is generated through illumination.

5. The method for enhancing contrast for the electro-optical video for live streaming as claimed in claim 1, wherein the plurality of electro-optical frames is generated through thermal imaging.

6. The method for enhancing contrast for the electro-optical video for live streaming as claimed in claim 1, wherein determining the distribution of intensity of the number of pixels in the image block includes generating a histogram for the number of pixels, and wherein the histogram is generated by hist[pixVal]=hist[pixVal]+1.

7. The method for enhancing contrast for the electro-optical video for live streaming as claimed in claim 6, wherein the method further comprises:

computing function of distribution for the histogram;

normalizing the histogram; and upon normalizing the histogram, determining weight of the histogram by calculating an inverse Euclidean distance between pixels and center of the histogram, wherein the weight is determined by $$w_k^i = \frac{1}{\sqrt{(x_i - x_k)^2 + (y_i - y_k)^2 + \varepsilon}}.$$

8. The method for enhancing contrast for the electro-optical video for live streaming as claimed in claim 7, wherein the method further comprises:

computing energy for each pixel using the function of distribution:

$$x_k' = CDF_k(x);$$

and
assigning weight of the histogram based on the energy by $$x'' = \sum_k x'_k \cdot w_k.$$

9. The method for enhancing contrast for the electro-optical video for live streaming as claimed in claim 1, wherein the first predetermined intensity corelates to the upper threshold and the second predetermined intensity corelates to the lower threshold.

10. A system for enhancing contrast for an electro-optical video for live streaming, the system comprising: an image processor to: receive an image block, wherein: the image block is part of an electro-optical frame, the electro-optical frame comprises a plurality of image blocks, the image block is one of the plurality of image blocks, and the electro-optical frame is one of a plurality of electro-optical frames generated from an image sensor to form the electro-optical video; compute intensity for the image block, wherein for the image block, the intensity is computed based on a number of pixels therein; and determine a distribution of intensity of the number of pixels in the image block, wherein each of the number of pixels has a pixel intensity; a quantizer communicably coupled to the image processor to: quantize a degree of variation in the intensity for the number of pixels, wherein the degree of variation in the intensity for the number of pixels by calculating a Gini coefficient by $$G = \frac{\sum_x (U(x) - C(x))}{\sum_x U(x)},$$

where G is Gini coefficient, U(x) is a uniform distribution function and C(x) is a cumulative distribution function; determine an upper threshold and a lower threshold for intensity of the number of pixels based on the degree of variation, wherein the lower threshold is determined by:

$$minThd = \frac{totalPixelNumber}{numberOfHistgramBins},$$

and the upper threshold is determined by m axThd= (1−giniCoef)*maxHistogramBinCount+ giniCoef*minThd, and wherein the upper threshold is a weighted sum of maximum number of pixels in a histogram bin and the lower threshold; determining an upper set of the number of pixels outlying the upper threshold; determining a lower set of the number of pixels outlying the lower threshold; modifying the distribution of pixel intensity by: for the upper set, reducing the pixel intensity of each of the pixels to a first predetermined intensity, and for the lower set, increasing the pixel intensity to a second predetermined intensity; modifying the degree of variation to determine a uniformity in distribution of intensity for the image block; constructing a transform using the uniformity to enhance the contrast of the image block; and applying the transform to the plurality of image blocks to enhance the contrast of the plurality of image blocks.

11. The system for enhancing contrast for the electro-optical video for live streaming as claimed in claim 10, wherein the image block has a size of 320*180 pixels.

12. The system for enhancing contrast for the electro-optical video for live streaming as claimed in claim 10, wherein each of the plurality of image blocks are/is separate blocks sharing no common area of the electro-optical frame.

13. The system for enhancing contrast for the electro-optical video for live streaming as claimed in claim 10, wherein the plurality of electro-optical frames is generated through illumination.

14. The system for enhancing contrast for the electro-optical video for live streaming as claimed in claim 10, wherein the plurality of electro-optical frames is generated through thermal imaging.

15. The system for enhancing contrast for the electro-optical video for live streaming as claimed in claim 10, wherein the image processor is configured to determine the distribution of intensity of the number of pixels in the image block by generating a histogram for the number of pixels, and wherein the histogram is generated by hist[pixVal]=hist[pixVal]+1.

16. The system for enhancing contrast for the electro-optical video for live streaming as claimed in claim 15, wherein the image processor is configured to:
compute function of distribution for the histogram;
normalize the histogram; and
upon normalizing the histogram, determine the weight of the histogram by calculating an inverse Euclidean distance between pixels and the center of the histogram,
wherein the weight is determined by $$w^i_k = \frac{1}{\sqrt{(x_i - x_k)^2 + (y_i - y_k)^2 + \varepsilon}}.$$

17. The system for enhancing contrast for the electro-optical video for live streaming as claimed in claim 16, wherein the image processor is configured to:
compute energy for each pixel using the function of distribution:

$$x'_k = CDF_k(x);$$

and
assign a/the weight of the histogram based on the energy by $$x'' = \sum_k x'_k \cdot w_k.$$

18. The system for enhancing contrast for the electro-optical video for live streaming as claimed in claim 10, wherein the first predetermined intensity correlates to the upper threshold and the second predetermined intensity correlates to the lower threshold.

* * * * *